United States Patent [19]

Krtolica

[11] Patent Number: 5,719,959
[45] Date of Patent: Feb. 17, 1998

[54] SIMILARITY DETERMINATION AMONG PATTERNS USING AFFINE-INVARIANT FEATURES

[75] Inventor: Radovan V. Krtolica, Palo Alto, Calif.

[73] Assignee: Canon Inc., Tokyo, Japan

[21] Appl. No.: 437,049

[22] Filed: May 9, 1995

Related U.S. Application Data

[63] Continuation of Ser. No. 909,034, Jul. 6, 1992.

[51] Int. Cl.$^6$ .................... G06K 9/62; G06K 9/46
[52] U.S. Cl. ................... 382/209; 382/202; 382/201; 382/259
[58] Field of Search ....................... 382/182, 186, 382/187, 191, 194, 197, 198, 209, 218, 202

[56] References Cited

U.S. PATENT DOCUMENTS

| | | | |
|---|---|---|---|
| 3,760,356 | 9/1973 | Srivastava | 340/146.3 |
| 3,846,752 | 11/1974 | Nakano et al. | 340/146.3 |
| 3,930,231 | 12/1975 | Henrichon, Jr. et al. | 340/146.3 |
| 3,993,976 | 11/1976 | Ginsburg | 340/146.3 |
| 4,225,850 | 9/1980 | Chang et al. | 340/146.3 |
| 4,241,329 | 12/1980 | Bahler et al. | 340/146.3 |
| 4,346,405 | 8/1982 | Yoda et al. | 358/105 |
| 4,513,441 | 4/1985 | Henshaw | 382/43 |
| 4,547,800 | 10/1985 | Masaki | 358/107 |
| 4,771,474 | 9/1988 | Takashima et al. | 382/56 |
| 4,817,176 | 3/1989 | Marshall et al. | 382/43 |
| 4,896,363 | 1/1990 | Taylor et al. | 382/125 |
| 5,023,918 | 6/1991 | Lipscomb | 382/24 |
| 5,204,915 | 4/1993 | Nishida | 382/21 |
| 5,267,332 | 11/1993 | Walch et al. | 382/55 |

OTHER PUBLICATIONS

"Morphological Approach to Machine Printed Character Recognition: A Feasibility Study" by R. Krtolica and B. Warner; SPIE/IS&T Technical Conference on Machine Vision Application in Character Recognition and Industrial Inspection, San Jose, CA, Feb. 1992.

"Pattern Recognition, Character Recognition and Optical Character Readers", by S.N. Srihari, V. Govindaraju, J.J. Hull, R.K. Fenrich and S. Lam; Technical Report CEDAR-TR-91-1, Center for Document Analysis and Recognition, State University of New York at Buffalo, Buffalo, N.Y., May 1991.

"Morphological Methods in Image and Signal Processing" by C.R. Giardina and E.R. Dougherty; Prentice-Hall, Englewood Cliffs, N.J., 1988.

"Distance in Graphs" by F. Buckley and F. Harary; Addison-Wesley Publishing Co., Redwood City, Ca., 1990.

Krtolica, R. "Graph Representation of Machine-Printed Character Bitmaps," Proc. SPIE, Image Algebra and Morphological Image Processing III, San Diego, CA, Jul. 1992, vol. 1769, pp. 227–238.

Lam, S. et al., "Thinning Methodologies—A Comprehensive Survey," IEEE Trans. on Pattern Analysis and Machine Intelligence, Sep. 1992, vol. 14, No. 9, pp. 869–885.

*Primary Examiner*—Jose L. Couso
*Assistant Examiner*—Matthew C. Bella
*Attorney, Agent, or Firm*—Fenwick & West LLP

[57] ABSTRACT

Pattern recognition, for instance optical character recognition, is achieved by forming a skeletal representation (400) of a pattern (300), processing the skeletal diagram (400) to improve representation of curved lines (308) in the pattern (300), representing the processed skeletal diagram (500) by a connectivity matrix (602), and finding a minimum spectral distance between the connectivity matrix (602) and a set of template matrices corresponding to known patterns.

10 Claims, 6 Drawing Sheets

| | 311 | 312 | 313 | 314 | 331 | 332 | 333 | 334 | 315 | 316 | 317 |
|---|---|---|---|---|---|---|---|---|---|---|---|
| 311 |  | I |  |  |  |  |  |  |  |  |  |
| 312 | I |  | I |  |  |  |  |  |  |  | I |
| 313 |  | I |  | I |  |  |  |  |  |  |  |
| 314 |  |  | I |  | I |  |  |  |  |  | I |
| 331 |  |  |  | I |  | I |  |  |  |  |  |
| 332 |  |  |  |  | I |  | I |  |  |  |  |
| 333 |  |  |  |  |  | I |  | I |  |  |  |
| 334 |  |  |  |  |  |  | I |  | I |  |  |
| 315 |  |  |  |  |  |  |  | I |  | I | I |
| 316 |  |  |  |  |  |  |  |  | I |  |  |
| 317 |  | I |  | I |  |  |  |  | I |  |  |

| | 701 | 702 | 703 | 704 | 705 | 706 | 707 | 708 | 709 | 710 | 711 |
|---|---|---|---|---|---|---|---|---|---|---|---|
| 701 | | | I | | | | | | | | |
| 702 | | | | I | | | | I | | | |
| 703 | I | | | I | | I | | | | | |
| 704 | | I | I | | I | | | | | | |
| 705 | | | | I | | | I | | | I | |
| 706 | | | I | | | | I | | | | |
| 707 | | | | | I | I | | | | | |
| 708 | | I | | | | | | | I | | |
| 709 | | | | | | | | I | | | I |
| 710 | | | | | I | | | | | | I |
| 711 | | | | | | | | | I | I | |

FIGURE.8 —802

|     | 901 | 902 | 903 | 904 | 905 | 906 | 907 | 908 | 909 |
| --- | --- | --- | --- | --- | --- | --- | --- | --- | --- |
| 901 |     | 1   |     |     |     |     |     |     | 1   |
| 902 | 1   |     |     |     |     |     |     |     |     |
| 903 |     |     |     |     |     |     |     | 1   |     |
| 904 |     |     |     |     | 1   |     | 1   |     |     |
| 905 |     |     |     | 1   |     | 1   |     |     |     |
| 906 |     |     |     |     | 1   |     |     | 1   |     |
| 907 |     |     |     | 1   |     |     |     |     | 1   |
| 908 |     |     | 1   |     |     | 1   |     |     |     |
| 909 | 1   |     |     |     |     |     | 1   |     |     |

SIMILARITY DETERMINATION AMONG PATTERNS USING AFFINE-INVARIANT FEATURES

RELATED APPLICATIONS

This is a continuation of co-pending U.S. patent application Ser. No. 07/909,034 filed on Jul. 6, 1992.

FIELD OF THE INVENTION

The present invention relates generally to image processing and specifically to recognition of patterns, such as optical characters, by comparing selected characteristics of a connectivity matrix for a skeletal diagram of a detected pattern to those of skeletal diagrams of known patterns.

DESCRIPTION OF RELATED ART

Numerous schemes have been proposed for pattern recognition in the past. A great deal of research and development has occurred, particularly in the area of optical character recognition (OCR). See, for example, S. N. Srihari, V. Govindaraju, J. J. Hull, R. K. Fenrich and S.Lam, "Pattern Recognition, Character Recognition and Optical Character Readers", Technical Report CEDAR-TR-91-1, Center for Document Analysis and Recognition, State University of New York at Buffalo, Buffalo, N.Y., May 1991.

Known schemes for OCR vary widely in their approaches. Some early attempts superimposed bit maps of detected images over templates of known characters. Such schemes were extremely sensitive to such factors as font differences, skewing, enlargement, and reduction. Other approaches concentrated on extracting particular features from detected characters. Results varied depending on the particular selection and processing of features.

U.S. Pat. No. 3,846,752 to Nakano et al. discloses character recognition apparatus using the density distribution of a character. The frequency spectrum of the density distribution is compared to that of density distributions corresponding to known characters, and the known character with the Fourier transform spectrum pattern most similar to that of the detected character is output as the recognized character.

U.S. Pat. No. 4,817,176 to Marshall et al. discloses another pattern recognition scheme using Fourier transformation, with various corrections for amplitude and phase differences.

U.S. Pat. No. 3,930,231 to Henrichon, Jr., et al. discloses use of a multiple cell grid for detection of pattern density and feature recognition. A vector signal is generated for a detected character based on the presence or absence of each recognizable feature, and this vector is compared with vectors representing known characters.

U.S. Pat. No. 3,993,976 to Ginsburg discloses pattern analysis using a transform to obtain spatial frequencies. The spatial frequencies are filtered to extract pattern information for determining general form, edge, texture, and depth information of the detected pattern.

U.S. Pat. No. 4,513,441 to Henshaw discloses comparison of two images by forming a composite overlay of the images and examining phase differences therein.

In other arts, U.S. Pat. No. 4,225,850 to Chang et al. discloses use of Fourier transform techniques to detect regions of an image field not containing fingerprint images. U.S. Pat. No. 4,547,800 to Masaki discloses detection of positional deviations of workpieces by making parallel transformations and rotations on workpiece images and making comparisons with reference image information. U.S. Pat. No. 4,346,405 to Yoda et al. discloses detection of temporal changes in television images by dividing a television screen into blocks and processing X-Y data for visual information therein. U.S. Pat. No. 4,241,329 to Bahler et al. discloses speech recognition using spectral statistics to recognize a keyword in a continuous audio signal. U.S. Pat. No. 3,760,356 to Srivastava discloses a technique for determining, within a set of binary numbers, an extreme binary number.

None of these teachings provides an adequately robust technique for recognizing optical characters or other patterns as corresponding to one of a known set of patterns.

DISCLOSURE OF INVENTION

In accordance with the present invention, a detected pattern (300) is recognized among a set of known template patterns, each of which consists of a number of connected line endpoints (e.g., 301) and line intersections (e.g., 302), by first detecting and labeling as nodes (e.g., 311, 312) the line endpoints (e.g., 301) and intersections (e.g., 302) of the detected character (300). From that information, a set of connected node pairs (e.g., 311, 312) is determined, and a connectivity matrix (602) is formed. The pattern is recognized by generating a spectrum for the connectivity matrix (602) and determining a minimum spectral distance between the matrix and matrices corresponding to known patterns.

BRIEF DESCRIPTION OF THE DRAWINGS

FIG. 8 illustrates a template connectivity matrix 802 corresponding to the skeletal diagram of FIG. 7 in accordance with the present invention.

FIG. 10 illustrates a template connectivity matrix 1002 corresponding to the skeletal diagram of FIG. 9 in accordance with the present invention.

BEST MODE FOR CARRYING OUT THE INVENTION

Figure 1:
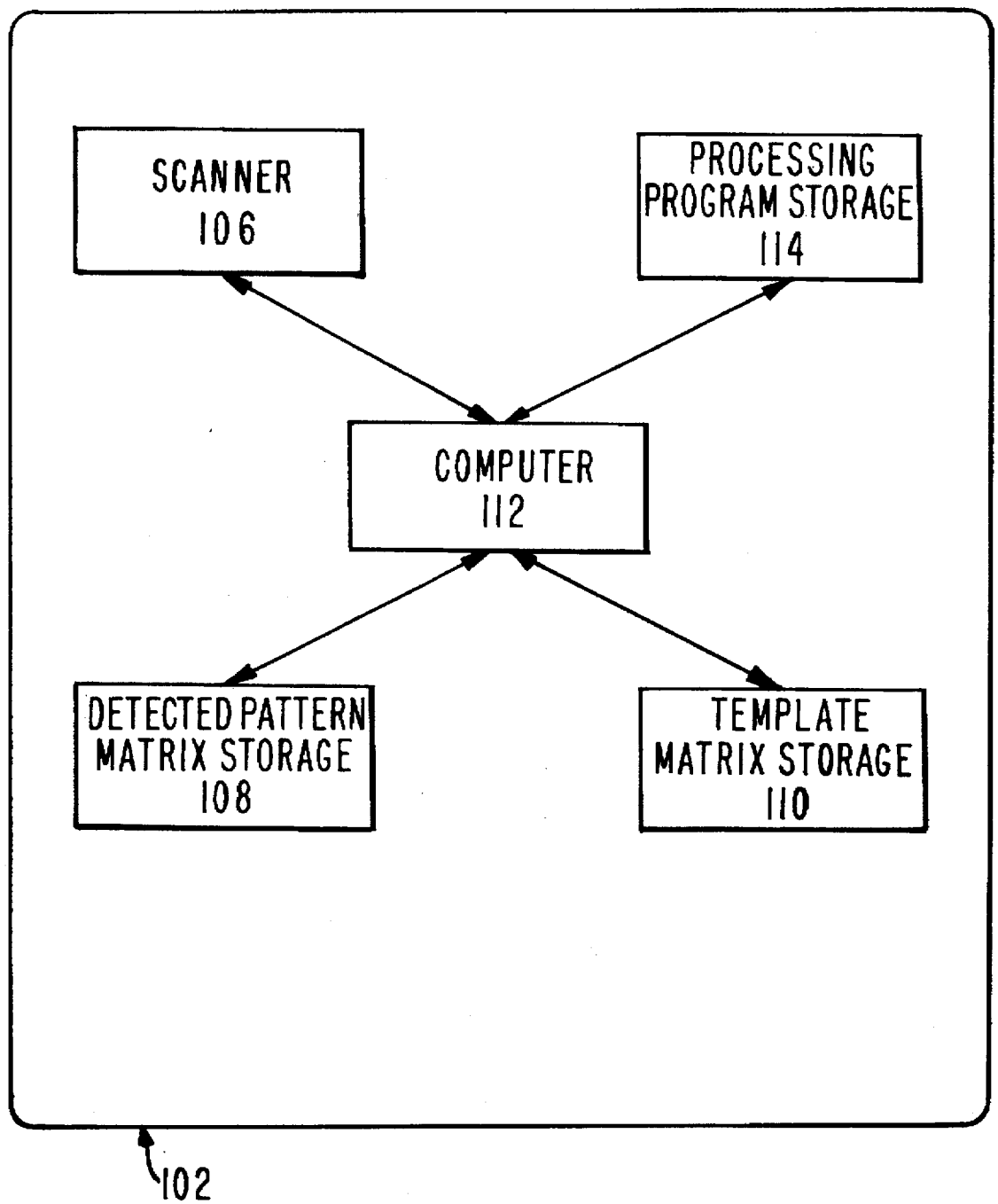
FIG. 1 is a functional block diagram of apparatus for pattern recognition in accordance with the present invention.

Referring now to FIG. 1, there is shown a system 102 for pattern recognition in accordance with the present invention.

Briefly, pattern information is detected by a computer 112 through use of a scanner 106 in the conventional manner. Any conventional general purpose scanner 106 and computer 112 may be used in accordance with the present invention. Other techniques for obtaining pattern information will be evident to those skilled in the art. A stored processing program 114 directs computer 112 to analyze the detected pattern information as will be explained in more detail below. As a result of this analysis, a matrix of affine-invariant pattern characteristics is stored in detected pattern matrix storage 108 and compared to matrices of known patterns stored in template matrix storage 110 by computer 112 under the control of stored processing program 114. The template pattern whose corresponding matrix, e.g., 802, has the smallest spectral distance to the matrix 602 of the detected pattern is considered the matching pattern, thus completing the pattern recognition. Alternatively, spectral data corresponding to the matrices, e.g., 602 rather than the matrices, e.g., 602, themselves may be stored in detected pattern matrix storage 108 and template matrix storage 110.

Figure 2:
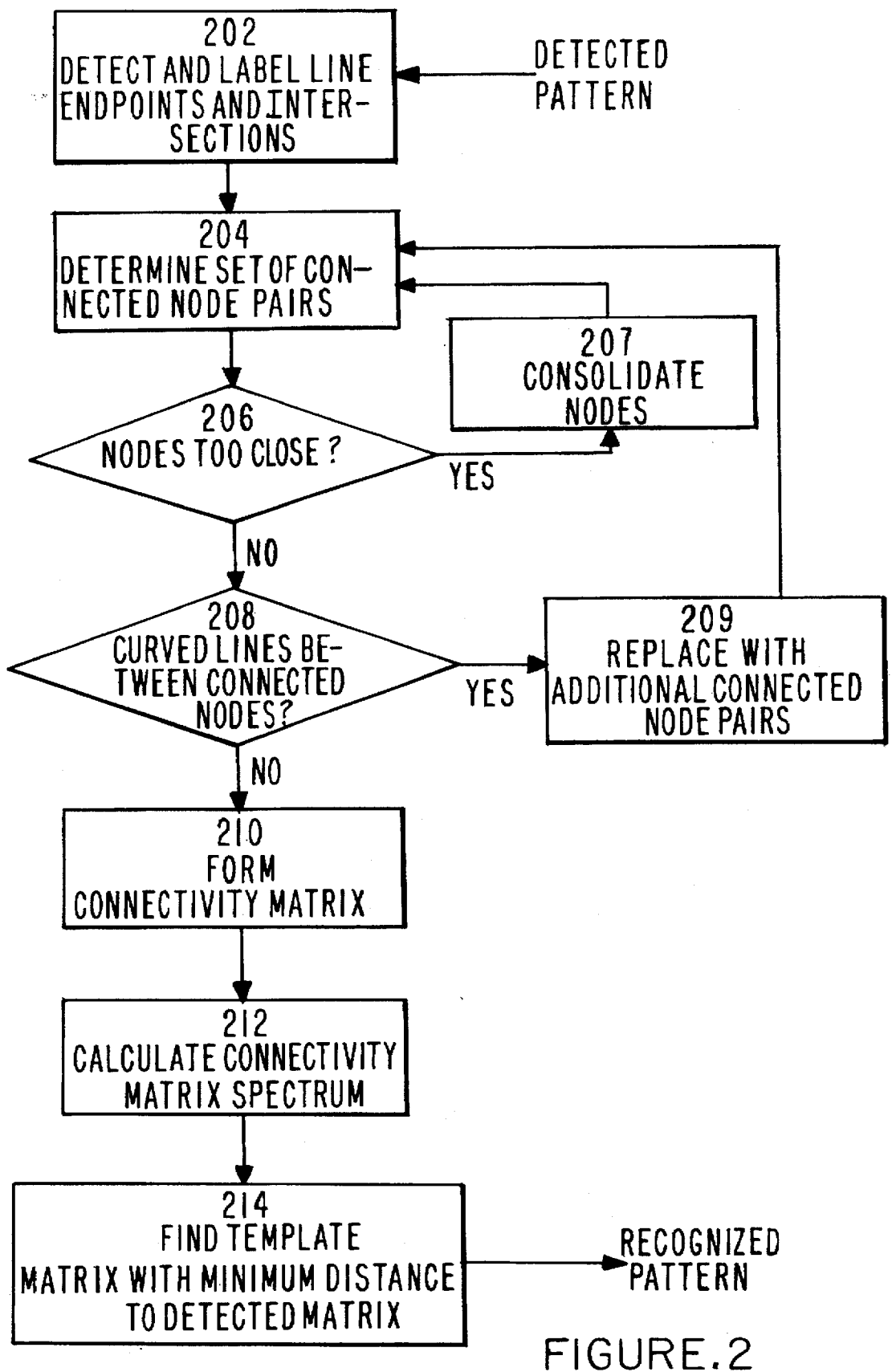
FIG. 2 is a flow diagram of a method of pattern recognition in accordance with the present invention.
Figure 3:
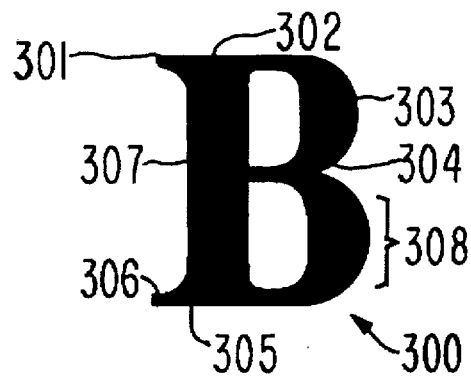
FIG. 3 is a diagram of an optical character illustrating line endpoints, e.g., 301, and line intersections, e.g., 302, in accordance with the present invention.
Figure 4:
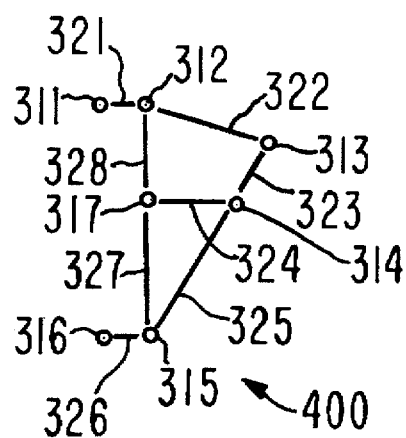
FIG. 4 is a skeletal diagram of line endpoint nodes, e.g., 311, line intersection nodes, e.g., 312, and connecting lines, e.g., 321, corresponding to the character 300 illustrated in FIG. 3 subsequent to sequential thinning and detection of endpoints, e.g., 301, and intersections, e.g., 302, in accordance with the present invention.
Figure 5:
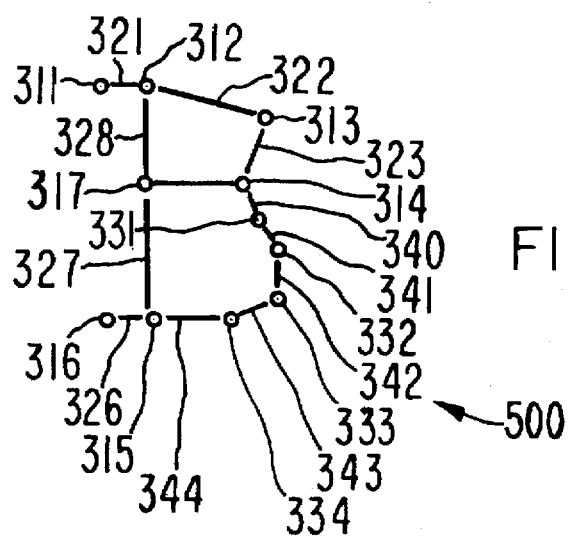
FIG. 5 is a skeletal diagram of line endpoint nodes, e.g., 311, line intersection nodes, e.g., 312, additional nodes, e.g., 331, and connecting lines, e.g., 321, corresponding to the character 300 illustrated in FIG. 3 subsequent to curve detection and node addition in accordance with the present invention.

Referring now to FIGS. 2–5, there is shown a flow diagram of a method of pattern recognition in accordance with the present invention. At step 202, the line endpoints, e.g., 301, and intersections, e.g., 302, of an input pattern are detected and labeled as nodes, e.g., 311. In accordance with the present invention, it makes no difference in what order the nodes, e.g., 311, are labeled. Processing in step 204 uses this node information to determine a set of connected node pairs, e.g., 311, 312. One affine-invariant feature useful for pattern recognition in general, and specifically for OCR, is a connectivity matrix of the intersections, e.g., 302, and ends, e.g., 301, of a character image 300. Referring also to FIG. 3, a character 300 includes end-points 301, 306 representative of the end of a line and intersections 302, 303, 304, 305, 307 representative of the meeting of two or more lines. Referring also to FIG. 4, a connected skeletal diagram 400 for character 300 includes nodes representing endpoints 311, 316, nodes representing intersections 312, 313, 314, 315, 317, and connecting lines, e.g, 321, between node pairs connected by non-zero image density in the character 300.

Connected skeletal diagram 400 is obtained from character 300 by use of discrete morphological processing on an image of character 300 imposed on a rectangular grid with binary values. The process of producing skeletal diagram 400 from character 300 uses conventional sequential thinning techniques involving the hit-miss transform, as described more fully in C. R. Giardina, E. R. Dougherty, *Morphological Methods in Image and Signal Processing*, Prentice-Hall, Englewood Cliffs, N.J., 1988. To increase the robustness of skeletal diagram 400, conventional thinning techniques are augmented in several respects. First, structural elements such as lines, ends, and intersections used in the thinning process are defined in two sets of axes. The first set is aligned with predetermined vertical and horizontal axes, while the second set is rotated 45 degrees from the first. This overcomes a difficulty in which non-orthogonal rotation of structuring elements introduces undesired distortions due to well-known properties of rectangular grid representations.

Another augmentation of conventional thinning is to recursively apply simple thinning with respect to each structuring element until the thinned object becomes invariant to further thinning, and rotating the structuring elements both clockwise and counterclockwise. Thinning typically depends on the direction in which the structuring elements are rotated, yet conventional thinning uses only unidirectional rotation. More robust results are obtained by applying sequential thinning to the set union of the two skeletal diagrams resulting from thinning in each direction.

The goal in the thinning process is to derive a one-pixel wide skeletal diagram 400 of character 300. Conventional techniques using structuring elements, known to one skilled in the art, are then used to determine endpoint nodes, e.g., 301, and intersection nodes, e.g., 302.

An artifact of this process is the occasional false identification of one node, e.g., 302, as a plural number of closely spaced individual nodes. Referring again to FIG. 2, this condition is tested for in step 206, and any such neighboring nodes are consolidated in step 207. Specifically, two nodes are merged into one if their distance, measured in pixels, is not larger than the thickness of strokes in character 300. The above techniques work well with 12 point upper case Courier font characters.

Referring again to FIG. 4, it is evident that the skeletal diagram 400 fails to include all of the features of character 300. For instance, the connecting line 325 does not accurately represent the curvature of the portion 308 of character 300 between intersection 304 (corresponding to node 314 of FIG. 4) and intersection 305 (corresponding to node 315 of FIG. 4). A distance metric described below on skeletal diagrams of the type shown in FIG. 4, e.g., 400, identifies 18 classes of objects among the set of 26 upper case alphabetic characters. Fourteen such classes are single letters, one class consists of the letters {GIJSU}, a second class consists of {PQ}, a third class consists of {LTY}, and a fourth class consists of {NZ}. Skeletal diagrams of the latter two classes are topologically equivalent (the L being equivalent to T and Y because of a serif in the Courier font). Skeletal diagrams of the former two classes are equivalent due to inadequate representation of curved lines. The ambiguity regarding the latter two classes can be resolved using conventional OCR techniques such as horizontal/vertical line counting or comparing locations of end-points.

In order to remove ambiguities due to inadequate representation of curved lines, step 208 checks for the existence of curved lines between pairs of connected nodes, and if curvature above a certain threshold is detected, step 209 replaces the existing representation of that connection with a representation having a larger number of connected nodes. For example, referring now also to FIGS. 3, 4, and 5, step 207 checks to see whether the line 325 connecting nodes 314 and 315 represents a portion 308 of character 300 that is curved. Since it does, processing in step 209 replaces line 325 with nodes 331–334 and lines 340–344. In the preferred embodiment, no more than 9 new nodes, mutually connected with an appropriate number of lines, are substituted for a line representing a curved portion of a character, but other configurations could be used in accordance with the present invention.

The method used to detect whether a character portion between two nodes, e.g., 314, 315, is straight or curved consists of four steps. First the portion 308 of the character 300 between intersections 304, 305 (or endpoints, e.g., 306, if appropriate) represented by nodes 314 and 315 is marked onto a bit-map in the conventional manner. Second, a straight line is fitted to the marked points on the bit-map using conventional least-squares techniques. Third, a second-order curve is also fitted to the same set of points. Fourth, the straight line residual is compared to the second-order curve residual. If the straight line residual is significantly larger than the curve residual, the portion 308 of the character 300 is considered to represent a curve, and processing flows to step 209 as described above to yield the skeletal diagram 500 representative of character 300.

The specific algorithm used to fit a second-order curve of the form $ax^2+by^2+cxy+dx+ey+f=0$ to a set of points $\{x_i, Y_i\}$ and determine the residual is as follows:

Procedure for Best Orthogonal Fitting of the Second-Order Curve

The general formula for the second order curve is:

$$ax^2+by^2+cxy+dx+ey+f=0. \quad (1.1)$$

We introduce the variables $$u:=x^2, v:=y^2, w:=xy \quad (1.2)$$

to obtain the relation $$au+bv+cw+dx+ey+f=0 \quad (1.3)$$

which describes a hyperplane in the five dimensional space $\{u,v, w,x,y\}$. We use the Hessian normal form of this hyperplane $$x \cos \alpha + y \cos \beta + u \cos \gamma + v \cos \delta + w \cos \epsilon = \rho \quad (1.4)$$

where $$\cos^2 \alpha + \cos^2 \beta + \cos^2 \gamma + \cos^2 \delta + \cos^2 \epsilon = 1 \quad (1.5)$$

With the vector notation $$r:=[x,y,u,v,w]^T, r_0:=[x_0, y_0, u_0, v_0, w_0]^T, \rho:=\|r_0\|, \quad (1.6)$$

the hyperplane is given as $$r^T r_0 = \rho \quad (1.7)$$

For the set $\{(x_i, y_i)|i=1,2, \ldots, N\}$ of sample points, a set of N points is generated in the five-dimensional space $$\{r_i|i=1,2,\ldots,N\}=\{(x_i, y_i, u_i, v_i, w_i)|i=1,2,\ldots,N\} \quad (1.8)$$

where $r_i:=[x_i, y_i, u_i, v_i, w_i]^T$, $(i =1,2, \ldots, N)$. The (orthogonal) distance of the point $r_i$ from the hyperplane is given as $e_i:=(r_i^T r_0/\rho)-\rho$ or else $$e_i = x_i \cos \alpha + y_i \cos \beta + u_i \cos \gamma + v_i \cos \delta + w_i \cos \epsilon - \rho. \quad (1.9)$$

It is well known that the mean-square distance $$J_N := \frac{1}{N} \sum_{i=1}^{N} e_i^2 \quad (1.10)$$

of the points (1.8) from the hyperplane (1.4) is minimized when cosines on the left hand side of the hyperplane equation are equal to the cosines of the eigenvector corresponding to the minimal eigenvalue of the covariance matrix $$Cov=R-mm^T \quad (1.11)$$

where $$R := \frac{1}{N} \sum_{i=1}^{N} \begin{vmatrix} x_i^2 & x_i y_i & x_i u_i & x_i v_i & x_i w_i \\ y_i x_i & y_i^2 & y_i u_i & y_i v_i & y_i w_i \\ u_i x_i & u_i y_i & u_i^2 & u_i v_i & u_i w_i \\ v_i x_i & v_i y_i & v_i u_i & v_i^2 & v_i w_i \\ w_i x_i & w_i y_i & w_i u_i & w_i v_i & w_i^2 \end{vmatrix} \quad (1.12)$$

$$m := \frac{1}{N} \sum_{i=1}^{N} [x_i\, y_i\, u_i\, v_i\, w_i]^T.$$

Hence, the hyperplane (1.4) that fits the best the set of points (1.8), that is,—minimizes the mean-square distance (1.10)—is obtained by calculating the covariance matrix Cov using the formulae (1.11) and (1.12), and then computing the minimal eigenvalue with the corresponding eigenvector for this matrix. The cosines of angles between this eigenvector and the five coordinate axes (x,y,u,v,w) are equal to the cosines of the best fitting hyperplane (1.4). The distance of the optimal hyperplane from the origin is computed by the formula $$\rho = \frac{1}{N} \sum_{i=1}^{N} (x_i \cos \alpha + y_i \cos \beta + u_i \cos \gamma + v_i \cos \delta + w_i \cos \epsilon). \quad (1.13)$$

Therefore, returning to the original coordinates, one sees that the parameters of the best-fitting second order curve are given as $$a=\cos \alpha,\, b=\cos \beta,\, c=\cos \gamma,\, d=\cos \delta,\, e=\cos \epsilon,\, f=-\rho. \quad (1.14)$$

As the minimal mean-square distance (1.10) is equal to the minimal eigenvalue of the matrix Cov, the residuum of the second-order curve fitting is equal to $\lambda_{min}$.

Referring to FIG. 6 and again to FIG. 2, once the adjacent node artifacts have been processed in steps 206 and 207, and curved lines between connected nodes have been represented by additional connected node pairs in steps 208 and 209, processing in step 210 forms a connectivity matrix 602 from the connected node pair information. Connectivity matrix 602 is a mathematical representation of skeletal diagram 500 of FIG. 5. The presence of the numeral "1" in FIG. 6 is representative of a connection between two nodes, e.g., 311, 312 of skeletal diagram 500, while the absence of a numeral "1" in FIG. 6 is representative of no connection between two nodes.

Referring again to FIG. 2, after connectivity matrix 602 is formed in step 210, a spectrum is calculated for connectivity matrix 602 in step 212. Such calculation is useful because there is a high correlation between the spectral similarity of two matrices and similarity of the matrices themselves. Furthermore, spectra resulting from similar matrices are similar regardless of the particular labeling convention used. These properties are set forth in greater detail in F. Buckley and F. Harary, *Distance an Graphs*, Addison-Wesley Publishing Co., Redwood City, Calif., 1990. Thus, a skeletal diagram is identifiable as one of a set of known template skeletal diagrams by comparing the matrix spectrum of the skeletal diagram to be identified with the matrix spectra of the known set.

The spectrum of a matrix is conventionally defined as the set of all the matrix eigenvalues, and is obtained from matrix 602 in a conventional manner. For example, the complete set of eigenvalues, or the spectrum, of the connectivity matrix 602 in FIG. 6 is given as $\{-2.4127, 1.8862, -1.3132, -0.859, -0.3642, 0.0, 0.2847, 0.9039, 1.4879, 1.7141, 2.4446\}$.

Figures 6, 7:
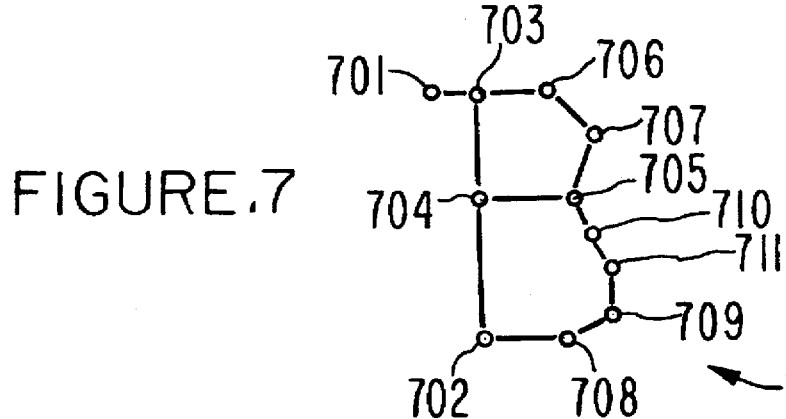
FIG. 6 illustrates a connectivity matrix 602 corresponding to the skeletal diagram 500 of FIG. 5 in accordance with the present invention.
FIG. 7 illustrates one possible skeletal diagram 700 representing the letter "B".

Similarly, the skeletal diagram 700 of the letter "B" in FIG. 7, comprising nodes 701 to 711, has a connectivity matrix 802 shown in FIG. 8, the spectrum of which is {−2.1538, −1.8019, −1.4761, −0.7307, −0.4450, −0.3268, 0.5973, 1.1579, 1.2470, 1.7284, 2.2038}.

Figure 9:
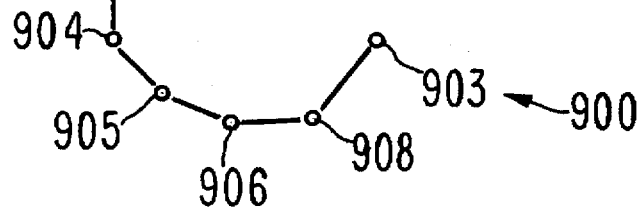
FIG. 9 illustrates one possible skeletal diagram 900 representing the letter "C".

As another example, the skeletal diagram 900 of the letter "C" in FIG. 9, comprising nodes 901 to 909, has a connectivity matrix 1002 shown in FIG. 10, the spectrum of which is {−1.9021, −1.6180, −1.1756, −0.6180, 0.0000, 0.6180, 1.1756, 1.6180, 1.9021}.

Referring still to FIG. 2, once the spectrum of matrix 602 is computed in step 212, the minimum spectral distance between matrix 602 and template matrices representing all the known patterns is calculated in step 214. Matrices 802 and 1002 are two examples of such template matrices. The spectral distance between matrix 602 and each template matrix is computed, and the template matrix having the minimum distance is selected as the recognized pattern.

One possible definition and calculation of the spectral distance between any two matrices is as follows:

Consider two skeletal diagrams $G_1$ and $G_2$ defined by their adjacency matrices $A_1 \in \{0,1\}^{m \times m}$, $A_2 \in \{0,1\}^{n \times n}$ with the corresponding spectra $\Lambda_1 = \{\alpha_1, \ldots, \alpha_p, \beta_1, \ldots, \beta_q\}$, $\Lambda_2 = \{\lambda_1, \ldots, \lambda_r, \mu_1, \ldots, \mu_s\}$, where p+q=m, r+s=n. As the matrices $A_1$ and $A_2$ are symmetric with zero diagonal ($A_1^T = A_1$, $A_2^T = A_2$), the eigenvalues in $\Lambda_1$ and $\Lambda_2$ are real. Without loss of generality, it is assumed that $\alpha_1 \leq \ldots \leq \alpha_p \leq 0 \leq \beta_1 \leq \ldots \leq \beta_q$; $\lambda_1 \leq \ldots \leq \lambda_r \leq 0 \leq \mu_1 \leq \ldots \leq \mu_s$; $p \geq r$, $q \geq s$ (m≥n). Denote by $x_1, \ldots, x_m$ any permutation of the sequence $\lambda_1, \ldots, \lambda_r, 0, \ldots, 0, \mu_1, \ldots, \mu_s$, where the number of zeros is equal to q−s+p−r=m−n. Let M be the set of all possible permutations of the sequence $\lambda_1, \ldots, \lambda_r, 0, \ldots, 0, \mu_1, \ldots, \mu_s$, and let $x := [x_1, \ldots, x_m]^T$ so that x∈M. For uniformity of notation, the vector y is introduced: $y = [y_1, \ldots, y_m]^T$, $y_k = \alpha_k$ (k=1, ..., q), $y_{p+k} = \beta_k$ (k=1, ..., q). In this way, the vector y can be compared to the vector x∈M.

The spectral distance $d_{12}$ between skeletal diagrams $G_1$ and $G_2$ is defined as $$d_{12} := \min \left\{ \sum_{k=1}^{m} |y_k - x_k| | (x_1, \ldots, x_m) \in M \right\}. \quad (2.1)$$

It has been shown (R. Krtolica, B. Warner, "Morphological Approach to Machine Printed Character Recognition: A Feasibility Study", SPIE/IS&T Technical Conference on Machine Vision Applications in Character Recognition and Industrial Inspection, 11–14 Feb. 1992, San Jose, Calif., paper #1661-11, incorporated herein by reference) that the spectral distance defined above may be calculated by the formula $$d_{12} = \sum_{k=1}^{r} |\alpha_k - \lambda_k| + \sum_{k=r+1}^{p} |\alpha_k| + \quad (2.2)$$

$$\sum_{k=1}^{s} |\beta_{q-k+1} - \mu_{s-k+1}| + \sum_{k=s+1}^{q} |\beta_{q-k+1}|.$$

Consider, for example, the spectral distances between matrices on FIGS. 6 and 8, and between matrices on FIGS. 6 and 10. The eigenvalues for the first case are $\alpha_1 = -2.1538$, $\alpha_2 = -1.8019$, $\alpha_3 = -1.4761$, $\alpha_4 = -0.7307$, $\alpha_5 = -0.445$, $\alpha_6 = -0.3268$, $\beta_1 = 0.5973$, $\beta_2 = 1.1579$, $\beta_3 = 1.247$, $\beta_4 = 1.7284$, $\beta_5 = 2.2038$, $\lambda_1 = -2.4127$, $\lambda_2 = -1.8862$, $\lambda_3 = -1.3132$, $\lambda_4 = -0.859$, $\lambda_5 = -0.3642$, $\mu_1 = 0.0$, $\mu_2 = 0.2847$, $\mu_3 = 0.9039$, $\mu_4 = 1.4879$, $\mu_5 = 1.7141$, $\mu_6 = 2.4446$, \quad (2.3)

with parameters p=6, q=5, r=5, s=6. According to the formula (2.2), the spectral distance $d_{68}$ between matrices in FIGS. 6 and 8 is calculated as $$d_{68} = \sum_{k=1}^{5} |\alpha_k - \lambda_k| + |\alpha_6| + \quad (2.4)$$

$$\sum_{k=1}^{5} |\beta_{6-k} - \mu_{7-k}| + |\mu_1| = 2.1406.$$

Note that the role of the μ and β variables has been interchanged, due to the fact that s>q. The eigenvalues of the matrix in FIG. 10 are $\lambda_1 = -1.9021$, $\lambda_2 = -1.618$, $\lambda_3 = -1.1756$, $\lambda_4 = -0.618$, $\mu_1 = 0.0$,
$\mu_2 = 0.618$, $\mu_3 = 1.1756$, $\mu_4 = 1.618$, $\mu_5 = 1.9021$, \quad (2.5)

with parameters r=4,s=5. Therefore, in the second case, the spectral distance $d_{610}$ is given as $$d_{610} = \sum_{k=1}^{4} |\alpha_k - \lambda_k| + \quad (2.6)$$

$$\sum_{k=5}^{6} |\alpha_k| + \sum_{k=1}^{5} |\beta_{6-k} - \mu_{6-k}| = 3.043.$$

As $d_{610} > d_{68}$, the template matrix in FIG. 8 is preferred to the template matrix in FIG. 10.

The "B" and "C" skeletal diagrams 700 and 900 in FIGS. 7 and 9 illustrate an extreme case of classification, wherein the number of intersection nodes, e.g., 312, of the sample skeletal diagram 500 for the letter "B" is different from the number of intersection nodes, e.g., 703, of the template skeletal diagram 700 for the same letter "B". Robustness of conventional feature extraction typically prevents this from happening in practice. Nevertheless, this example shows that spectral distance may help recognition even in such an extreme case.

Although the preferred definition and calculation of a spectral distance set forth above works well for the recognition of upper-case 12-point Courier font characters, other spectral distance definitions and calculations could be used as well in accordance with the present invention.

Therefore, pattern recognition is achieved by forming a skeletal representation of a pattern such as a character, representing the skeletal diagram by a connectivity matrix, and finding a minimum spectral distance between the connectivity matrix and a set of template matrices corresponding to known patterns.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

I claim:

1. A computer-implemented process of detecting, analyzing and recognizing a physical pattern, regardless of particular handwriting style or font, among a set of known template patterns, the physical pattern and the template patterns each having a plurality of lines connecting a plurality of line endpoints and line intersections, the process comprising the steps of:

a) detecting and labeling as a plurality of nodes said line endpoints and line intersections of said physical pattern;

b) determining a set of connected node pairs responsive to existence of said lines among said nodes;

c) forming a detected connectivity matrix responsive to the results of step b;

d) determining, by a computer system, a spectrum for said detected connectivity matrix;

e) determining, by said computer system, a spectral distance metric indicating a degree of relative similarity between said detected connectivity matrix and each of a set of template connectivity matrices corresponding to said set of known template patterns; and f) recognizing said physical pattern as that template pattern whose connectivity matrix has a minimum spectral distance metric indicating a maximum degree of similarity to said detected connectivity matrix.

2. A computer-implemented process as set forth in claim 1, further comprising the steps of:

determining a degree of curvature of one of said lines;

replacing the connected node pair corresponding to said one line with at least two new connected node pairs responsive to said degree of curvature to increase the total number of node pairs in the physical pattern; and forming said detected connectivity matrix responsive to the results of said replacing step.

3. A computer-implemented process of detecting, analyzing and recognizing a physical pattern among a set of known template patterns, the physical pattern and the template patterns each having a plurality of lines connecting a plurality of line endpoints and line intersections, the physical pattern having a thickness of stroke, the process comprising the steps of:

a) detecting and labeling as a plurality of nodes said line endpoints and line intersections of said physical pattern;

b) determining a set of connected node pairs responsive to existence of said lines amount said nodes;

c) determining a degree of closeness among a subset of said set of connected node pairs relative to said thickness of stroke;

d) replacing said subset with a single node responsive to said degree of closeness;

e) forming a detected connectivity matrix responsive to the results of steps b and d;

f) determining, by a computer system, a spectrum for said detected connectivity matrix;

g) determining, by said computer system, a spectral distance metric between said detected connectivity matrix and each of a set of template connectivity matrices corresponding to said set of known template patterns; and f) recognizing said physical pattern as that template pattern whose connectivity matrix has a minimum spectral distance metric to said detected connectivity matrix.

4. A computer-implemented process as set forth in claim 1, wherein the physical pattern is an optical character and the set of known template patterns comprises alphanumeric characters.

5. A computer-implemented process as set forth in claim 1, wherein said spectrum comprises a set of eigenvalues for said detected connectivity matrix.

6. Apparatus for detecting, analyzing and recognizing a physical pattern, regardless of particular handwriting style or font, among a set of known template patterns, the physical pattern and the template patterns each having a plurality of lines connecting a plurality of line endpoints and line intersections, the apparatus comprising:

a first processing element for detecting and labeling as a plurality of nodes said line endpoints and line intersections of said physical pattern, determining therefrom a set of connected node pairs responsive to existence of said lines among said nodes, and forming therefrom a detected connectivity matrix;

detected pattern memory for storing a first data set representative of said detected connectivity matrix;

template memory for storing a second data set representative of template connectivity matrices corresponding to said set of known template patterns; and a second processing element for receiving said first data set and said second data set, for determining therefrom a minimum spectral distance metric indicating a degree of relative similarity between said detected connectivity matrix and said template connectivity matrices, and for recognizing said physical pattern as one of said set of known template patterns responsive to said minimum spectral distance metric indicating a maximum degree of similarity.

7. Apparatus as in claim 6, wherein said first processing element comprises a scanner and a computer controlled by a first stored processing program, and said second processing element comprises said computer controlled by a second stored processing program.

8. Apparatus as in claim 7, wherein said first stored processing program and said second stored processing program form modules of an overall stored processing program.

9. Apparatus as in claim 6, wherein said first data set representative of said detected connectivity matrix comprises spectral data.

10. Apparatus as in claim 6, wherein said second data set representative of template connectivity matrices comprises spectral data.

* * * * *